(12) United States Patent
Gronow et al.

(10) Patent No.: US 8,473,368 B2
(45) Date of Patent: Jun. 25, 2013

(54) METHOD, SYSTEM AND CONTROLLER FOR PROVIDING GOODS AND /OR SERVICES TO CONSUMERS

(75) Inventors: Brett James Gronow, Fitzroy (AU); Keith David Deverell, Collingwood (AU); Jonathan David Pak, Fitzroy North (AU); Christopher Glendon Bates, Box Hill North (AU)

(73) Assignee: Someones Group Intellectual Property Holdings Pty Ltd, Fitzroy, VIC (AU)

( * ) Notice: Subject to any disclaimer, the term of this patent is extended or adjusted under 35 U.S.C. 154(b) by 0 days.

(21) Appl. No.: 13/321,822

(22) PCT Filed: Dec. 23, 2010

(86) PCT No.: PCT/AU2010/001744
§ 371 (c)(1),
(2), (4) Date: Jan. 20, 2012

(87) PCT Pub. No.: WO2011/075792
PCT Pub. Date: Jun. 30, 2011

(65) Prior Publication Data
US 2012/0136750 A1 May 31, 2012

(30) Foreign Application Priority Data
Dec. 24, 2009 (AU) ................................ 2009906294

(51) Int. Cl.
*G06Q 30/00* (2006.01)
(52) U.S. Cl.
USPC ..... 705/26.7; 705/26.1; 705/27.1; 705/14.51; 705/14.52; 705/1.1

(58) Field of Classification Search
USPC .......... 705/26.7, 26.1, 27.1, 14.51, 52, 14.52, 705/1.1
See application file for complete search history.

(56) References Cited

U.S. PATENT DOCUMENTS

| | | | | |
|---|---|---|---|---|
| 5,410,344 | A * | 4/1995 | Graves et al. | 725/46 |
| 6,012,051 | A * | 1/2000 | Sammon et al. | 706/52 |
| 6,317,722 | B1 * | 11/2001 | Jacobi et al. | 705/14.51 |
| 8,108,246 | B2 * | 1/2012 | Gale et al. | 705/7.35 |
| 8,121,915 | B1 * | 2/2012 | Igoe et al. | 705/35 |
| 2001/0032123 | A1 | 10/2001 | Burns et al. | |
| 2004/0158480 | A1 * | 8/2004 | Lubars et al. | 705/1 |
| 2006/0106670 | A1 | 5/2006 | Cai et al. | |
| 2008/0120363 | A1 | 5/2008 | Loveland | |

OTHER PUBLICATIONS

Australian Patent Office, International Search Report and Written Opinion, Mar. 8, 2001, Woden Act 2606, Australia.

* cited by examiner

*Primary Examiner* — Yogesh C Garg
(74) *Attorney, Agent, or Firm* — Louis Ventre, Jr.

(57) ABSTRACT

A method, system and controller is provided for a selection service recommending or providing access to goods or service items to a consumer, comprising the steps of: identifying a set of available items at least some of which require payment to item providers for access (1201); predicting a measure of likely enjoyment of each available item by the consumer (1202)/calculating a measure of value for money of each available item for the consumer (1203); and recommending or providing access to items to the consumer that will represent good value for money (1204).

16 Claims, 2 Drawing Sheets

METHOD, SYSTEM AND CONTROLLER FOR PROVIDING GOODS AND /OR SERVICES TO CONSUMERS

FIELD

The present invention relates to a computerized method, system and controller for providing goods and/or services to consumers, in particular but not limited to recommending or providing access to media items to consumers.

BACKGROUND TO THE INVENTION

Recommendation systems for matching goods and/or services to the preferences of consumers are well known and widely used in internet-based provision of media items. Applications include books, songs, videos and other media items or non-media goods or services such as auctioning, introduction, cars, and houses. Typically such systems rely on matching characteristics of available items with characteristics desired by the consumer. The complexity of such recommendation systems varies widely, from simple search engines based on user specified tags to systems that match based on derived descriptors provided by examples.

Where items are offered at different prices, typically the price is displayed as additional information and plays no part in the recommendation, other than possibly being selected as an allowable price range by the consumer.

There is no account taken in prior art systems of the need to match consumers with items that will present value for money having regard to the preferences of the consumer.

SUMMARY OF THE INVENTION

According to a first aspect of the invention there is provided a method of a selection service recommending or providing access to goods or service items to a consumer, comprising the steps of:
  identifying a set of available items at least some of which require payment to item providers for access;
  predicting a measure of likely enjoyment of each available item by the consumer;
  calculating a measure of value for money of each available item for the consumer;
  recommending or providing access to items to the consumer that will represent good value for money.

In one embodiment the items comprise digital media items to be accessed over a network.

In one embodiment the item providers comprise authors, creators or producers of media items.

In one embodiment there are a plurality of consumers, each of which pays the service to receive access to media items. The consumers may pay a periodical fee to receive the access to media items. The media item providers may be paid by the service on the basis of each consumer use of the media item.

In one embodiment the step of predicting a measure of likely enjoyment of each available item by the consumer comprises calculating a closeness of fit of each available item with example items or categories enjoyed by the consumer. The example items or categories may be specified by the consumer or deduced by past consumer behaviour.

In one embodiment the step of calculating a measure of value for money of each available item for each consumer comprises
  calculating a value of each available item for each consumer at least on the basis of the measure of likely enjoyment; and
  comparing the value with any said payment required for access.

In one embodiment the step of recommending or providing access to items to the consumer that will represent good value for money comprises:
  selecting items whose value exceeds any said payment required for access;
  recommending or providing access to the selected items on a per use frequency basis that depends on the excess value.

In one embodiment the method further comprises the step of adjusting a payment to be made per use of at least one of the available items so as to increase a total amount paid in respect of said item.

In some embodiments the items may be songs that access to which is provided by the service in a playlist.

According to a second aspect of the invention there is provided a system for enabling a selection service to recommend or provide access to goods or service items to a consumer, comprising:
  an interface for the consumer to access the items;
  an available item identifier for identifying a set of available items at least some of which require payment to item providers for access;
  a likely enjoyment predictor for predicting a measure of likely enjoyment of each available item by the consumer;
  a value for money calculator for calculating a measure of value for money of each available item for each consumer; and
  an access decider for recommending or providing access to items to the consumer that will represent good value for money.

According to a third aspect of the invention there is provided a controller for enabling a selection service to recommend or provide access to media items to a consumer over an interface, comprising:
  an available item identifier for identifying a set of available items at least some of which require payment to item providers for access;
  a likely enjoyment predictor for predicting a measure of likely enjoyment of each available item by the consumer;
  a value for money calculator for calculating a measure of value for money of each available item for each consumer; and
  an access decider for recommending or providing access to items to the consumer that will represent good value for money.

According to a fourth aspect of the invention there is provided computer program code which when executed by a computing device causes the computing device to implement the method of the first aspect of the invention.

According to a fifth aspect of the invention there is provided a computer readable medium comprising the program code of the fourth aspect of the invention.

According to a sixth aspect of the invention there is provided a data signal comprising the computer program code of the fourth aspect of the invention.

DETAILED DESCRIPTION OF EMBODIMENTS

Figure 1:
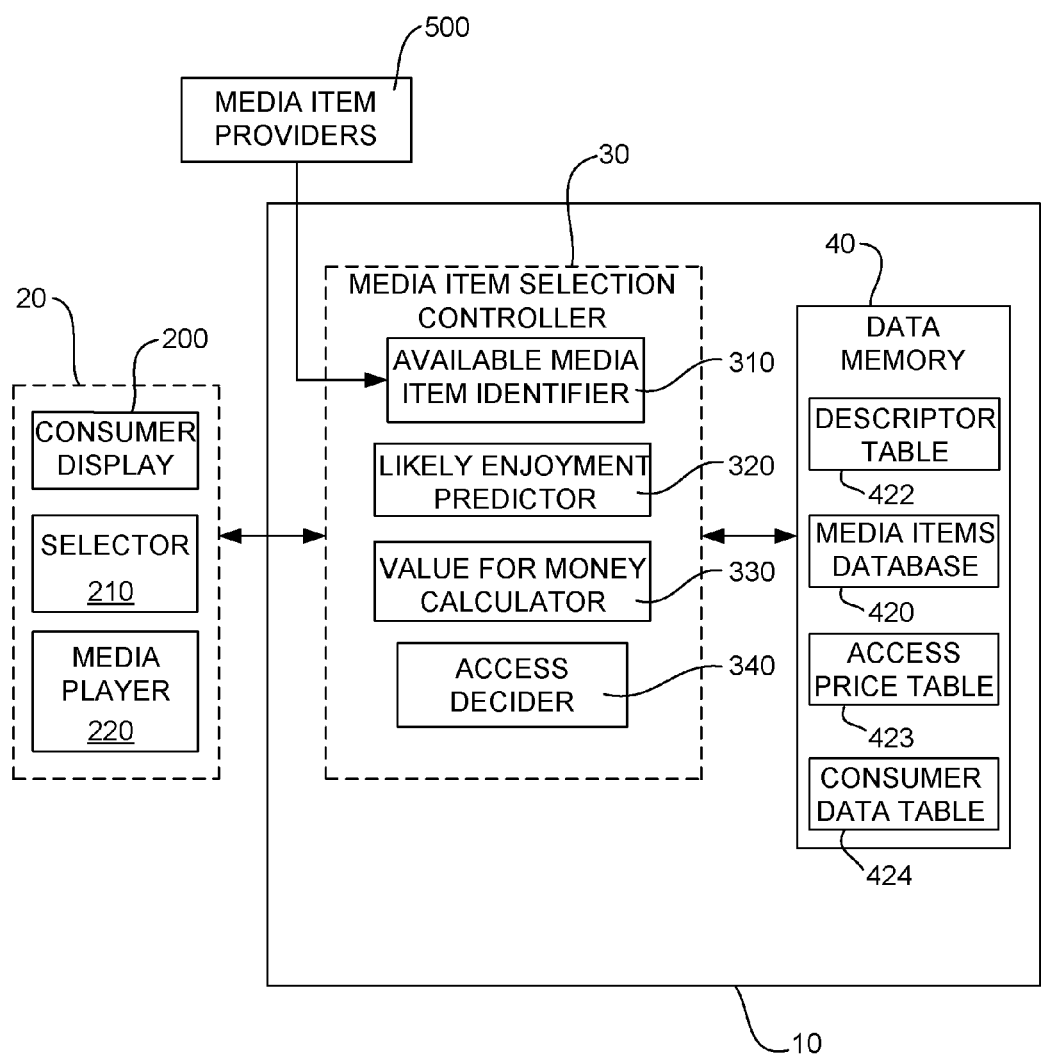
FIG. 1 is a block diagram of an example system of the current invention, applied to the provision of media items.
Figure 2:
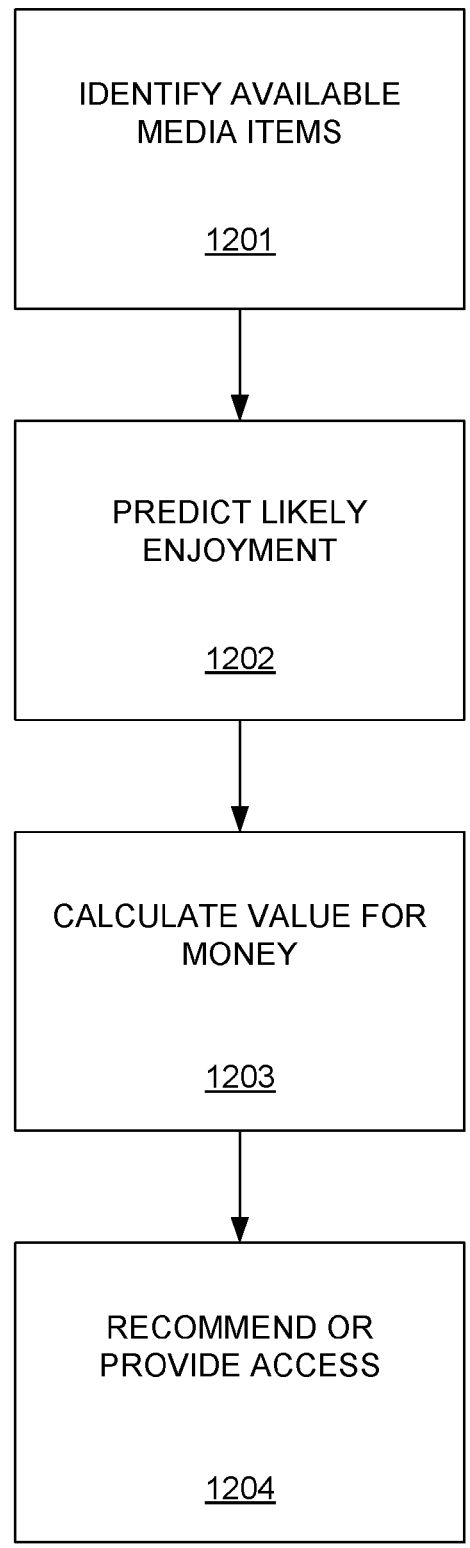
FIG. 2 shows a flow diagram for the method of current invention as applied to media items.

Referring to the drawings, there is shown various aspects of a system, controller and method according to an embodiment of the invention.

The system may take a number of different forms. In a preferred form, the system is provided on a server communicating with consumers and item providers over the internet.

Referring now to FIG. 1, the core components at the broadest level of the system 10 as applied to media items are a media selection controller 30 in communication with data memory 40, all or part of which may be remotely located. Media selection controller 30 is in data communication with media item providers 500 and at least one (most commonly many) consumers via each consumer's interface 20.

Media selection controller 30 contains available media item identifier 310 for identifying a set of available media items at least some of which require payment to media item providers 500 for access, typically a price per play if the media item is a song. Media item identifier may comprise for example a web interface where providers 500 may register their interest and their media items.

Media selection controller 30 also contains likely enjoyment predictor 320 that predicts a measure of likely enjoyment of each of the available media items by the or each consumer. This is performed by consulting consumer data table 424 which may contain examples of media items preferred by the or each consumer, and comparing those data with descriptor table 422 which contains characteristics of each media item held in the media item database 420. Closeness of fit to the descriptors is used to predict the likely enjoyment. Many possible measures can be contemplated and trialled and are within the scope of the invention.

Media selection controller 30 also contains value for money calculator 330 which calculates a measure of value for money of each available media item for the or each consumer. This is typically performed calculating a monetary value for access to the media item from the measure of likely enjoyment and other parameters. Such other parameters may include reference to a total purchasing budget of the service and the total anticipated number of accesses that may need to be purchased by the service.

Media selection controller 30 also contains access decider 340 that finally decides which media items to provide or recommend to the consumer that will represent good value for money. This may include random selection with weighted probabilities depending on how much the value for money exceeds price.

Example Playlist System

In this example the consumer pays a set periodical subscription fee per month for access to a music selection service.

In return for the subscription fee the consumer can play songs from an internet-accessible library purchased by the service from music providers. The consumer may be able to manually select songs but also is provided an automatically-generated playlist that is determined based on the consumer's preferences. In this example, the service pays a price per play to each music provider.

As is known in the art, the consumer can select a plurality of songs and the system can recommend similar music.

Typically, such recommendations are based on accumulated data on the songs, enjoyed by the consumer compared with the songs enjoyed by other consumers, resulting in a recommendation that "people who enjoyed this also enjoyed that". Less commonly, predictions are made based on native audio qualities to find inherently similar music.

In the current example of the invention, native qualities or a combination of native qualities and other consumer preferences are used to find similar music when the consumer clicks a button that says "find music like this".

When any music is played, the consumer has the option of clicking "more of this" or "less of this" buttons. If a song is played many times per month, it is assumed that the consumer currently prefers this song over others.

Both of these data indicates to the system a consumer rating for the played music.

Based on this information and other consumer behaviours it is possible to predict how many songs a consumer will listen to per month from the library, and across which kind of songs they typically are spread.

In the current example, we incorporate pricing into a recommendation system so that it can recommend media items that are good value for money as well as likely to appeal to the consumer.

In this example, each consumer defines an example "playlist" by selecting a number of songs similar to the one they wish to hear, and/or by specifying a number of parameters (genre, date of release etc). If the consumer defines examples of more than one playlist, each playlist is treated as if they came from separate consumers.

The recommendation system then rates all songs depending on how well they fit these parameters. In terms of example songs, the recommendation algorithm may use native media descriptors and distil these descriptors down to a manageable set of about 30 descriptors using single value decomposition (SVD). Example native media descriptors for images and audio are provided in the references section at the end of this description. The recommendation algorithms may provide a rating that relates to a distance in the descriptor space between each available song and the group of example songs selected—such as the distance to the closest example song, or the average distance to all the example songs. A high rating denotes items that are a small distance—i.e. a good fit; and a low rating denotes items that are a large distance—i.e. a poor fit. The result is a rating matrix such as is shown below in Table 1. In this scenario there are 6 consumers and 10 songs available. This is for illustrative purposes only, as in reality there will be multitudes of uses and available songs.

TABLE 1

Scenario 1, Ratings Matrix—R

| Song | Consumer | | | | | |
|---|---|---|---|---|---|---|
| | 1 | 2 | 3 | 4 | 5 | 6 |
| 1 | 3.69 | 1.45 | 3.40 | 2.26 | 3.36 | 3.80 |
| 2 | 0.19 | 2.35 | 0.09 | 1.79 | 2.29 | 4.92 |
| 3 | 3.34 | 3.95 | 4.79 | 3.90 | 0.27 | 0.78 |
| 4 | 1.45 | 0.69 | 3.33 | 0.73 | 3.56 | 0.16 |
| 5 | 1.68 | 4.85 | 0.35 | 3.94 | 2.92 | 0.75 |
| 6 | 1.22 | 1.37 | 0.92 | 2.44 | 2.85 | 1.59 |
| 7 | 0.49 | 0.47 | 0.31 | 1.86 | 3.80 | 3.05 |
| 8 | 2.86 | 2.28 | 3.01 | 3.76 | 0.15 | 0.95 |
| 9 | 4.65 | 4.08 | 3.26 | 3.22 | 1.44 | 0.54 |
| 10 | 2.09 | 2.97 | 3.71 | 4.92 | 1.02 | 0.09 |
| Total | 21.65 | 24.46 | 23.16 | 28.83 | 21.67 | 16.62 |

The system has a maximum amount of money that it can spend on the provision of playlists—X, in this scenario X=$150.

The system also knows in advance the quantity of songs required for each consumer, determined by past behavior trends.

TABLE 2

Scenario 1, Quantity Vector—Q

| | 1 | 2 | 3 | 4 | 5 | 6 | Total |
|---|---|---|---|---|---|---|---|
| Quantity Required | 10 | 20 | 19 | 17 | 20 | 10 | 96 |

Each song producer is allowed to set prices for their songs.

TABLE 3

Scenario 1, Price Vector - P

| Song | Price per Play |
|---|---|
| 1 | 1.70 |
| 2 | 1.20 |
| 3 | 1.24 |
| 4 | 2.90 |
| 5 | 1.94 |
| 6 | 1.61 |
| 7 | 2.02 |
| 8 | 1.51 |
| 9 | 3.00 |
| 10 | 1000.00 |

Song 10 is a special case and represents songs controlled by the Someones system. It is used as a form of monetary policy to ensure that the market does not go out of control and exceed the maximum expenditure as set by X. The method in which it achieves this operation will be detailed later in Scenario 2. In this scenario it is treated as though it were priced at a value of $1000 at which the system will not select it.

From the ratings table 'R' the system in this example of the invention approximates the value the song adds to the playlist by assuming that songs rated higher are also valued higher, e.g. Playlist 2, Song 2 is rated at 2.35 and Song 1 is rated 1.45, so for this playlist Song 2 is rated 1.62 times more than Song 1 (2.35/1.45)

The system applies this to the Rating matrix by dividing the column vectors by the column totals, and then to make sure this matrix is comparable to future tables (which may have more items), the system multiplies the resulting table by the total number of songs, so that the total of each column is the number of available songs.

TABLE 4

Scenario 1, Inferred Value Table - $V^1$

| | Consumer | | | | | |
|---|---|---|---|---|---|---|
| Song | 1 | 2 | 3 | 4 | 5 | 6 |
| 1 | 1.71 | 0.59 | 1.47 | 0.78 | 1.55 | 2.28 |
| 2 | 0.09 | 0.96 | 0.04 | 0.62 | 1.06 | 2.96 |
| 3 | 1.54 | 1.61 | 2.07 | 1.35 | 0.13 | 0.47 |
| 4 | 0.67 | 0.28 | 1.44 | 0.25 | 1.65 | 0.09 |
| 5 | 0.78 | 1.98 | 0.15 | 1.37 | 1.35 | 0.45 |
| 6 | 0.56 | 0.56 | 0.40 | 0.85 | 1.32 | 0.96 |
| 7 | 0.23 | 0.19 | 0.13 | 0.65 | 1.76 | 1.83 |
| 8 | 1.32 | 0.93 | 1.30 | 1.30 | 0.07 | 0.57 |
| 9 | 2.15 | 1.67 | 1.41 | 1.12 | 0.66 | 0.32 |
| 10 | 0.96 | 1.21 | 1.60 | 1.71 | 0.47 | 0.05 |
| | 10.00 | 10.00 | 10.00 | 10.00 | 10.00 | 10.00 |

If the value of each song in each playlist is supposed to be a reflection of the price each consumer was willing to pay to have the song in the playlist, this table assumes that the mean price for each song is equal to 1 (sum of the column divided by total number of songs). However, the system knows from X (the maximum amount we, wish to spend—150) and the quantity vector Q (Table 2, Sum of Q=96) that the mean price available to spend across all songs is 1.563 (150/96). The system therefore adjusts the value table accordingly, so that the average of all the entries is the average price that is available to spend per play.

TABLE 5

Scenario 1, Mean Adjusted Value Table - $V^2$

| | Consumer | | | | | |
|---|---|---|---|---|---|---|
| Song | 1 | 2 | 3 | 4 | 5 | 6 |
| 1 | 2.66 | 0.93 | 2.29 | 1.23 | 2.42 | 3.57 |
| 2 | 0.14 | 1.50 | 0.06 | 0.97 | 1.65 | 4.62 |
| 3 | 2.41 | 2.52 | 3.23 | 2.11 | 0.20 | 0.73 |
| 4 | 1.04 | 0.44 | 2.24 | 0.40 | 2.57 | 0.15 |
| 5 | 1.22 | 3.10 | 0.24 | 2.14 | 2.11 | 0.71 |
| 6 | 0.88 | 0.88 | 0.62 | 1.32 | 2.06 | 1.50 |
| 7 | 0.35 | 0.30 | 0.21 | 1.01 | 2.74 | 2.86 |
| 8 | 2.06 | 1.46 | 2.03 | 2.04 | 0.11 | 0.89 |
| 9 | 3.36 | 2.60 | 2.20 | 1.75 | 1.04 | 0.51 |
| 10 | 1.51 | 1.90 | 2.50 | 2.67 | 0.73 | 0.08 |
| | 15.63 | 15.63 | 15.63 | 15.63 | 15.63 | 15.63 |

The system then subtracts the producer prices (P) from each column in the mean adjusted value table $V^2$ to estimate whether each consumer would consider this price value for money, consistent with the amount available to spend overall. This represents the amount of consumer value surplus generated if a particular track is purchased. For example, if the song is valued at 2.5 for this consumer, and they manage to purchase the song for 1, then 1.5 value surplus is acquired.

TABLE 6

Scenario 1, Consumer Surplus Table - $S^1$

| | Consumer | | | | | |
|---|---|---|---|---|---|---|
| Song | 1 | 2 | 3 | 4 | 5 | 6 |
| 1 | 0.97 | −0.77 | 0.59 | −0.47 | 0.72 | 1.87 |
| 2 | −1.06 | 0.30 | −1.14 | −0.23 | 0.45 | 3.43 |
| 3 | 1.17 | 1.28 | 1.99 | 0.88 | −1.04 | −0.50 |
| 4 | −1.86 | −2.46 | −0.66 | −2.50 | −0.33 | −2.75 |
| 5 | −0.73 | 1.16 | −1.70 | 0.20 | 0.17 | −1.23 |
| 6 | −0.73 | −0.73 | −0.99 | −0.29 | 0.44 | −0.12 |
| 7 | −1.66 | −1.72 | −1.81 | −1.01 | 0.73 | 0.85 |
| 8 | 0.55 | −0.06 | 0.52 | 0.52 | −1.41 | −0.62 |
| 9 | 0.36 | −0.40 | −0.80 | −1.25 | −1.96 | −2.49 |
| 10 | −998.49 | −998.10 | −997.50 | −997.33 | −999.27 | −999.92 |

In this table, negative values are where consumers would not not think the price represents good value for money.

These consumers would not purchase these items at such price points, if they were asked to make the purchase decision. Therefore, the system sets these values to zero, as shown in Table 8 below.

TABLE 7

Scenario 1, Non-Negative Consumer Surplus Table - $S^2$

| | Consumer | | | | | |
|---|---|---|---|---|---|---|
| Song | 1 | 2 | 3 | 4 | 5 | 6 |
| 1 | 0.97 | 0.00 | 0.59 | 0.00 | 0.72 | 1.87 |
| 2 | 0.00 | 0.30 | 0.00 | 0.00 | 0.45 | 3.43 |
| 3 | 1.17 | 1.28 | 1.99 | 0.88 | 0.00 | 0.00 |
| 4 | 0.00 | 0.00 | 0.00 | 0.00 | 0.00 | 0.00 |
| 5 | 0.00 | 1.16 | 0.00 | 0.20 | 0.17 | 0.00 |
| 6 | 0.00 | 0.00 | 0.00 | 0.00 | 0.44 | 0.00 |
| 7 | 0.00 | 0.00 | 0.00 | 0.00 | 0.73 | 0.85 |
| 8 | 0.55 | 0.00 | 0.52 | 0.52 | 0.00 | 0.00 |
| 9 | 0.36 | 0.00 | 0.00 | 0.00 | 0.00 | 0.00 |
| 10 | 0.00 | 0.00 | 0.00 | 0.00 | 0.00 | 0.00 |
| Total | 3.04 | 2.75 | 3.10 | 1.59 | 2.51 | 6.14 |

In order to maximize value for money (utility) each consumer would usually purchase whatever item presents the highest gain in consumer surplus. In this case, each consumer would only ever pick one song (the one with highest consumer surplus) and purchase as many copies of that song as possible. This rarely happens in the real world due to the fact that goods are rarely perfect substitutes (as assumed here). One way to account for this would be to use indifference curve analysis to calculate the nonlinear substitution effect. However, this is highly non-trivial and complicates; the solution. A much easier method that approximates the indifference curve solution would be to use a pro-rata distribution. To perform the pro-rata distribution, we divide each element in the non-negative consumer surplus table with the column totals, and multiply by the quantity totals. This step assumes that distributing purchases in this manner optimizes utility as measured by consumer surplus, and that any other distribution would result in less consumer surplus.

TABLE 8

Scenario 1, Optimized (Value for Money) Quantity Provision - $Q^2$

| | Consumer | | | | | | |
|---|---|---|---|---|---|---|---|
| Song | 1 | 2 | 3 | 4 | 5 | 6 | Total |
| 1 | 3.18 | 0.00 | 3.63 | 0.00 | 5.75 | 3.05 | 15.61 |
| 2 | 0.00 | 2.21 | 0.00 | 0.00 | 3.61 | 5.58 | 11.39 |
| 3 | 3.85 | 9.35 | 12.20 | 9.35 | 0.00 | 0.00 | 34.74 |
| 4 | 0.00 | 0.00 | 0.00 | 0.00 | 0.00 | 0.00 | 0.00 |
| 5 | 0.00 | 8.44 | 0.00 | 2.09 | 1.34 | 0.00 | 11.86 |
| 6 | 0.00 | 0.00 | 0.00 | 0.00 | 3.53 | 0.00 | 3.53 |
| 7 | 0.00 | 0.00 | 0.00 | 0.00 | 5.77 | 1.38 | 7.15 |
| 8 | 1.80 | 0.00 | 3.17 | 5.57 | 0.00 | 0.00 | 10.54 |
| 9 | 1.17 | 0.00 | 0.00 | 0.00 | 0.00 | 0.00 | 1.17 |
| 10 | 0.00 | 0.00 | 0.00 | 0.00 | 0.00 | 0.00 | 0.00 |
| Total | 10.00 | 20.00 | 19.00 | 17.00 | 20.00 | 10.00 | |

Next we calculate cost of provision by multiplying the row totals of $Q^2$ by the prices listed in the price table P.

TABLE 9

Scenario 1, Cost of Provision - C

| | Consumer | | | | | | |
|---|---|---|---|---|---|---|---|
| Song | 1 | 2 | 3 | 4 | 5 | 6 | Total |
| 1 | 5.40 | 0.00 | 6.17 | 0.00 | 9.77 | 5.17 | 26.51 |
| 2 | 0.00 | 2.64 | 0.00 | 0.00 | 4.32 | 6.68 | 13.64 |
| 3 | 4.76 | 11.57 | 15.10 | 11.57 | 0.00 | 0.00 | 43.00 |
| 4 | 0.00 | 0.00 | 0.00 | 0.00 | 0.00 | 0.00 | 0.00 |
| 5 | 0.00 | 16.38 | 0.00 | 4.05 | 2.59 | 0.00 | 23.02 |
| 6 | 0.00 | 0.00 | 0.00 | 0.00 | 5.70 | 0.00 | 5.70 |
| 7 | 0.00 | 0.00 | 0.00 | 0.00 | 11.64 | 2.78 | 14.42 |
| 8 | 2.73 | 0.00 | 4.80 | 8.43 | 0.00 | 0.00 | 15.96 |
| 9 | 3.52 | 0.00 | 0.00 | 0.00 | 0.00 | 0.00 | 3.52 |
| 10 | 0.00 | 0.00 | 0.00 | 0.00 | 0.00 | 0.00 | 0.00 |
| Total | 16.40 | 30.60 | 26.07 | 24.05 | 34.02 | 14.63 | 145.76 |

From this table we can see that we have managed to produce an outcome that presents the optimal value for money for each consumer, for less than the maximum expenditure amount X (150). At this point the market clears and no further changes are required.

The quantities in table 8 are used to generate the playlists. These are not whole numbers, and in fact when in typical situations there are many more valued songs available then likely total plays, the quantities will be mostly fractional. The system uses these quantities to generate a playlist for each consumer according to a probability model. For example, for consumer 1, 10 songs will be played, and as each entry in the playlist is selected, a random number is used to decide which of the 10 available songs will be played, according to the probability 3.18/10=0.318 for song 1, zero for song 2, 3.85/10=0.385 for song 3, and so on. In this way, on average the predicted amount is spent overall and consumers are played songs that they would value the most above the price of acquisition, in proportion to the surplus value. The are many other ways of using table 8 to generate playlists, and this is just one example.

Scenario 2—Use of Monetary Policy when Market does not Clear

This scenario is the same as scenario 1 except X is now set to $120. Following the same methodology the system obtains the following Quantity and Cost of Provisions table, shown in Table 11. Note that changing the value of X changes the mean price, and thus changes the Mean Adjusted Value Table and thus changes the optimized quantity provision $Q^2$. Table 12 is the new costs of provision table, and as can be seen from the bottom right corner, the cost exceeds the budget of $120.

TABLE 10

Scenario 2, Optimized (Value for Money) Quantity Provision - $Q^2$

| | Consumer | | | | | | |
|---|---|---|---|---|---|---|---|
| Song | 1 | 2 | 3 | 4 | 5 | 6 | Total |
| 1 | 3.45 | 0.00 | 1.61 | 0.00 | 8.35 | 2.94 | 16.35 |
| 2 | 0.00 | 0.05 | 0.00 | 0.00 | 4.32 | 6.36 | 10.73 |
| 3 | 5.48 | 11.79 | 16.07 | 13.57 | 0.00 | 0.00 | 46.91 |
| 4 | 0.00 | 0.00 | 0.00 | 0.00 | 0.00 | 0.00 | 0.00 |
| 5 | 0.00 | 8.16 | 0.00 | 0.00 | 0.00 | 0.00 | 8.16 |
| 6 | 0.00 | 0.00 | 0.00 | 0.00 | 1.14 | 0.00 | 1.14 |
| 7 | 0.00 | 0.00 | 0.00 | 0.00 | 6.19 | 0.69 | 6.88 |
| 8 | 1.07 | 0.00 | 1.32 | 3.43 | 0.00 | 0.00 | 5.82 |
| 9 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 |
| Total | 10.00 | 20.00 | 19.00 | 17.00 | 20.00 | 10.00 | |

TABLE 11

Scenario 2, Cost of Provision - C

| Song | Consumer 1 | 2 | 3 | 4 | 5 | 6 | Total |
|---|---|---|---|---|---|---|---|
| 1 | 5.86 | 0.00 | 2.73 | 0.00 | 14.18 | 5.00 | 27.77 |
| 2 | 0.00 | 0.06 | 0.00 | 0.00 | 5.17 | 7.62 | 12.85 |
| 3 | 6.78 | 14.59 | 19.89 | 16.80 | 0.00 | 0.00 | 58.05 |
| 4 | 0.00 | 0.00 | 0.00 | 0.00 | 0.00 | 0.00 | 0.00 |
| 5 | 0.00 | 15.84 | 0.00 | 0.00 | 0.00 | 0.00 | 15.84 |
| 6 | 0.00 | 0.00 | 0.00 | 0.00 | 1.84 | 0.00 | 1.84 |
| 7 | 0.00 | 0.00 | 0.00 | 0.00 | 12.48 | 1.40 | 13.88 |
| 8 | 1.63 | 0.00 | 2.00 | 5.19 | 0.00 | 0.00 | 8.82 |
| 9 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 |
| Total | 14.26 | 30.49 | 24.62 | 21.99 | 33.68 | 14.01 | 139.06 |

The system adjusts by finding the Price of Song 10 (using a solver algorithm, as are well-known) such that the market clears (the sum of cost of provision of Songs 1 to 9 across all consumers equals X, where X equals 120). See Table 13.

TABLE 12

Scenario 2, Optimized Price Vector - P*

| Song | Price per Play |
|---|---|
| 1 | 1.70 |
| 2 | 1.20 |
| 3 | 1.24 |
| 4 | 2.90 |
| 5 | 1.94 |
| 6 | 1.61 |
| 7 | 2.02 |
| 8 | 1.51 |
| 9 | 3.00 |
| 10 | 1.47 |

TABLE 13

Scenario 2, Updated Quantity Table - $Q^2$

| Song | Consumer 1 | 2 | 3 | 4 | 5 | 6 | Total |
|---|---|---|---|---|---|---|---|
| 1 | 3.45 | 0.00 | 1.21 | 0.00 | 8.35 | 2.94 | 15.95 |
| 2 | 0.00 | 0.05 | 0.00 | 0.00 | 4.32 | 6.36 | 10.73 |
| 3 | 5.48 | 11.38 | 12.05 | 6.26 | 0.00 | 0.00 | 35.17 |
| 4 | 0.00 | 0.00 | 0.00 | 0.00 | 0.00 | 0.00 | 0.00 |
| 5 | 0.00 | 7.88 | 0.00 | 0.00 | 0.00 | 0.00 | 7.88 |
| 6 | 0.00 | 0.00 | 0.00 | 0.00 | 1.14 | 0.00 | 1.14 |
| 7 | 0.00 | 0.00 | 0.00 | 0.00 | 6.19 | 0.69 | 6.88 |
| 8 | 1.07 | 0.00 | 0.99 | 1.58 | 0.00 | 0.00 | 3.65 |
| 9 | 0.00 | 0.00 | 0.00 | 0.00 | 0.00 | 0.00 | 0.00 |
| 10 | 0.00 | 0.69 | 4.75 | 9.16 | 0.00 | 0.00 | 14.60 |
| Total | 10.00 | 20.00 | 19.00 | 17.00 | 20.00 | 10.00 | 96.00 |

TABLE 14

Scenario 2, Optimal Cost of Provision Table (Song 10 not counted) - C

| Song | Consumer 1 | 2 | 3 | 4 | 5 | 6 | Total |
|---|---|---|---|---|---|---|---|
| 1 | 5.86 | 0.00 | 2.05 | 0.00 | 14.18 | 5.00 | 27.09 |
| 2 | 0.00 | 0.06 | 0.00 | 0.00 | 5.17 | 7.62 | 12.84 |
| 3 | 6.78 | 14.09 | 14.92 | 7.75 | 0.00 | 0.00 | 43.53 |
| 4 | 0.00 | 0.00 | 0.00 | 0.00 | 0.00 | 0.00 | 0.00 |
| 5 | 0.00 | 15.29 | 0.00 | 0.00 | 0.00 | 0.00 | 15.29 |
| 6 | 0.00 | 0.00 | 0.00 | 0.00 | 1.84 | 0.00 | 1.84 |
| 7 | 0.00 | 0.00 | 0.00 | 0.00 | 12.48 | 1.40 | 13.88 |
| 8 | 1.63 | 0.00 | 1.50 | 2.39 | 0.00 | 0.00 | 5.52 |
| 9 | 0.00 | 0.00 | 0.00 | 0.00 | 0.00 | 0.00 | 0.00 |
| 10 | 0.00 | 1.01 | 6.98 | 13.47 | 0.00 | 0.00 | 21.47 |
| Total | 14.26 | 30.45 | 25.45 | 23.61 | 33.68 | 14.01 | 141.47 |

In this scenario, 120 units are spent on. Songs 1 to 9. The cost of provision for Song 10 (21.47) is negated (provided for free). Song 10 could be owned by the service, and thus provided for free.

Scenario 3

In scenario 2, only one song was given away as part of the service. This scenario explores the possibility of giving away more than one song in order satisfy different tastes in playlists. To achieve this result, the inferred prices of the discounted songs can be assumed to be the same price.

Below is the outcome where both Song 9 and 10 are discounted and given away free of charge by the service.

TABLE 15

Scenario 3, Optimized Price Table (with Song 9 and 10 owned by service) - P

| Song | Price per Play |
|---|---|
| 1 | 1.70 |
| 2 | 1.20 |
| 3 | 1.24 |
| 4 | 2.90 |
| 5 | 1.94 |
| 6 | 1.61 |
| 7 | 2.02 |
| 8 | 1.51 |
| 9 | 1.86 |
| 10 | 1.86 |

TABLE 16

Scenario 3, Optimized Cost of Provision (Song 9 and 10 not counted) - C

| Song | consumer 1 | 2 | 3 | 4 | 5 | 6 |
|---|---|---|---|---|---|---|
| 1 | 3.54 | 0.00 | 2.52 | 0.00 | 14.18 | 5.00 |
| 2 | 0.00 | 0.05 | 0.00 | 0.00 | 5.17 | 7.62 |
| 3 | 4.10 | 12.51 | 18.30 | 11.37 | 0.00 | 0.00 |
| 4 | 0.00 | 0.00 | 0.00 | 0.00 | 0.00 | 0.00 |
| 5 | 0.00 | 13.58 | 0.00 | 0.00 | 0.00 | 0.00 |
| 6 | 0.00 | 0.00 | 0.00 | 0.00 | 1.84 | 0.00 |
| 7 | 0.00 | 0.00 | 0.00 | 0.00 | 12.48 | 1.40 |
| 8 | 0.98 | 0.00 | 1.84 | 3.51 | 0.00 | 0.00 |
| 9 | 7.37 | 5.30 | 0.00 | 0.00 | 0.00 | 0.00 |
| 10 | 0.00 | 0.00 | 2.82 | 10.24 | 0.00 | 0.00 |

In this case Song 9 is provided to consumers 1 and 2, and Song 10 is provided to consumers 3 and 4. Compare this to the case where only Song 10 was controlled by the service, where Song 10 was provided to Consumer 2 in small quantities. In this case a better fit is achieved with consumer 2's ideal playlist by giving them Song 9 instead.

Scenario 4—Taking into Account Songs that Consumers Already Own

This scenario deals with the case where certain consumers already own certain songs and we do not need to pay for provision of these songs on the playlists. In this case the system follows the same process except it does not count these songs when working out the cost of provision.

Using the same Songs and prices as scenario 1, we have the ratings matrix R

TABLE 17

Scenario 4, Ratings Matrix-R

| Song | consumer | | | | | |
|---|---|---|---|---|---|---|
| | 1 | 2 | 3 | 4 | 5 | 6 |
| 1 | 3.69 | 1.45 | 3.40 | 2.26 | 3.36 | 3.80 |
| 2 | 0.19 | 2.35 | 0.09 | 1.79 | 2.29 | 4.92 |
| 3 | 3.34 | 3.95 | 4.79 | 3.90 | 0.27 | 0.78 |
| 4 | 1.45 | 0.69 | 3.33 | 0.73 | 3.56 | 0.16 |
| 5 | 1.68 | 4.85 | 0.35 | 3.94 | 2.92 | 0.75 |
| 6 | 1.22 | 1.37 | 0.92 | 2.44 | 2.85 | 1.59 |
| 7 | 0.49 | 0.47 | 0.31 | 1.86 | 3.80 | 3.05 |
| 8 | 2.86 | 2.28 | 3.01 | 3.76 | 0.15 | 0.95 |
| 9 | 4.65 | 4.08 | 3.26 | 3.22 | 1.44 | 0.54 |
| 10 | 2.09 | 2.97 | 3.71 | 4.92 | 1.02 | 0.09 |
| Total | 21.65 | 24.46 | 23.16 | 28.83 | 21.67 | 16.62 |

This time songs already owned by consumers are highlighted. X is assumed to be $150. Q is assumed the same:

TABLE 18

Scenario 4, Quantity Vector - Q

| | 1 | 2 | 3 | 4 | 5 | 6 | Total |
|---|---|---|---|---|---|---|---|
| Quantity Required | 10 | 20 | 19 | 17 | 20 | 10 | 96 |

Again each producer is allowed to set prices for their songs.

TABLE 19

Scenario 4 Price Vector - P

| Song | Price per Play |
|---|---|
| 1 | 1.70 |
| 2 | 1.20 |
| 3 | 1.24 |
| 4 | 2.90 |
| 5 | 1.94 |
| 6 | 1.61 |
| 7 | 2.02 |
| 8 | 1.51 |
| 9 | 3.00 |
| 10 | 1000.00 |

As before, the system creates approximate values each song adds to the playlist using the ratings table to create $V^1$ and $V^2$. See Table 22 below

TABLE 20

Scenario 4 Inferred Value Table-$V^1$

| Song | consumer | | | | | |
|---|---|---|---|---|---|---|
| | 1 | 2 | 3 | 4 | 5 | 6 |
| 1 | 1.71 | 0.59 | 1.47 | 0.78 | 1.55 | 2.28 |
| 2 | 0.09 | 0.96 | 0.04 | 0.62 | 1.06 | 2.96 |
| 3 | 1.54 | 1.61 | 2.07 | 1.35 | 0.13 | 0.47 |
| 4 | 0.67 | 0.28 | 1.44 | 0.25 | 1.65 | 0.09 |
| 5 | 0.78 | 1.98 | 0.15 | 1.37 | 1.35 | 0.45 |
| 6 | 0.56 | 0.56 | 0.40 | 0.85 | 1.32 | 0.96 |
| 7 | 0.23 | 0.19 | 0.13 | 0.65 | 1.76 | 1.83 |
| 8 | 1.32 | 0.93 | 1.30 | 1.30 | 0.07 | 0.57 |
| 9 | 2.15 | 1.67 | 1.41 | 1.12 | 0.66 | 0.32 |
| 10 | 0.96 | 1.21 | 1.60 | 1.71 | 0.47 | 0.05 |
| | 10.00 | 10.00 | 10.00 | 10.00 | 10.00 | 10.00 |

TABLE 21

Scenario 4 Mean Adjusted Value Table-$V^2$

| Song | consumer | | | | | |
|---|---|---|---|---|---|---|
| | 1 | 2 | 3 | 4 | 5 | 6 |
| 1 | 2.13 | 0.74 | 1.83 | 0.98 | 1.94 | 2.86 |
| 2 | 0.11 | 1.20 | 0.05 | 0.78 | 1.32 | 3.70 |
| 3 | 1.93 | 2.02 | 2.58 | 1.69 | 0.16 | 0.59 |
| 4 | 0.83 | 0.35 | 1.79 | 0.32 | 2.06 | 0.12 |
| 5 | 0.97 | 2.48 | 0.19 | 1.71 | 1.69 | 0.56 |
| 6 | 0.70 | 0.70 | 0.50 | 1.06 | 1.65 | 1.20 |
| 7 | 0.28 | 0.24 | 0.17 | 0.81 | 2.19 | 2.29 |
| 8 | 1.65 | 1.17 | 1.63 | 1.63 | 0.09 | 0.72 |
| 9 | 2.68 | 2.08 | 1.76 | 1.40 | 0.83 | 0.40 |
| 10 | 1.20 | 1.52 | 2.00 | 2.13 | 0.59 | 0.07 |
| | 12.50 | 12.50 | 12.50 | 12.50 | 12.50 | 12.50 |

The system then subtracts the producer prices (P) from each column in the mean adjusted value table $V^2$ to estimate whether each consumer would consider this price value for money, except the highlighted songs. These can be provided for free so zero is subtracted.

TABLE 22

Scenario 4 consumer Surplus Table-$S^1$

| Song | Consumer | | | | | |
|---|---|---|---|---|---|---|
| | 1 | 2 | 3 | 4 | 5 | 6 |
| 1 | 0.43 | -0.96 | 0.13 | -0.72 | 0.24 | 1.16 |
| 2 | -1.09 | 0.00 | -1.15 | -0.42 | 0.12 | 2.50 |
| 3 | 1.93 | 0.78 | 1.34 | 0.45 | 0.16 | -0.65 |
| 4 | -2.07 | -2.55 | 1.79 | -2.58 | -0.84 | 0.12 |
| 5 | -0.97 | 0.54 | -1.75 | 1.71 | -0.25 | -1.38 |
| 6 | -0.91 | -0.91 | -1.12 | -0.55 | 0.03 | -0.41 |
| 7 | -1.73 | 0.24 | -1.85 | -1.21 | 2.19 | 0.27 |
| 8 | 0.13 | -0.35 | 0.11 | 0.11 | -1.43 | -0.80 |
| 9 | -0.32 | -0.92 | -1.24 | -1.60 | -2.17 | -2.60 |
| 10 | -998.80 | -998.48 | -998.00 | -997.87 | -999.41 | -999.93 |

TABLE 23

Scenario 4 Non-Negative Consumer Surplus Table-$S^2$

| Song | Consumer 1 | 2 | 3 | 4 | 5 | 6 |
|---|---|---|---|---|---|---|
| 1 | 0.43 | 0.00 | 0.13 | 0.00 | 0.24 | 1.16 |
| 2 | 0.00 | 0.00 | 0.00 | 0.00 | 0.12 | 2.50 |
| 3 | 1.93 | 0.78 | 1.34 | 0.45 | 0.16 | 0.00 |
| 4 | 0.00 | 0.00 | 1.79 | 0.00 | 0.00 | 0.12 |
| 5 | 0.00 | 0.54 | 0.00 | 1.71 | 0.00 | 0.00 |
| 6 | 0.00 | 0.00 | 0.00 | 0.00 | 0.03 | 0.00 |
| 7 | 0.00 | 0.24 | 0.00 | 0.00 | 2.19 | 0.27 |
| 8 | 0.13 | 0.00 | 0.11 | 0.11 | 0.00 | 0.00 |
| 9 | 0.00 | 0.00 | 0.00 | 0.00 | 0.00 | 0.00 |
| 10 | 0.00 | 0.00 | 0.00 | 0.00 | 0.00 | 0.00 |
| Total | 2.49 | 1.56 | 3.38 | 2.28 | 2.74 | 4.05 |

The system as before then performs a pro-rata distribution:

TABLE 24

Scenario 4 Optimized (Value for Money) Quantity Provision-$Q^2$

| Song | Consumer 1 | 2 | 3 | 4 | 5 | 6 | Total |
|---|---|---|---|---|---|---|---|
| 1 | 1.73 | 0.00 | 0.75 | 0.00 | 1.73 | 2.85 | 7.06 |
| 2 | 0.00 | 0.04 | 0.00 | 0.00 | 0.90 | 6.18 | 7.12 |
| 3 | 7.73 | 9.98 | 7.55 | 3.39 | 1.14 | 0.00 | 29.79 |
| 4 | 0.00 | 0.00 | 10.08 | 0.00 | 0.00 | 0.29 | 10.37 |
| 5 | 0.00 | 6.91 | 0.00 | 12.76 | 0.00 | 0.00 | 19.67 |
| 6 | 0.00 | 0.00 | 0.00 | 0.00 | 0.24 | 0.00 | 0.24 |
| 7 | 0.00 | 3.07 | 0.00 | 0.00 | 15.99 | 0.67 | 19.74 |
| 8 | 0.54 | 0.00 | 0.62 | 0.86 | 0.00 | 0.00 | 2.02 |
| 9 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 |
| Total | 10.00 | 20.00 | 19.00 | 17.00 | 20.00 | 10.00 | 96.00 |

Next the system calculates cost of provision by multiplying the quantity entries of $Q^2$ by the prices listed in the price table P as shown in table 27 below.

TABLE 25

Scenario 4 Optimized Cost of Provision-C

| Song | Consumer 1 | 2 | 3 | 4 | 5 | 6 |
|---|---|---|---|---|---|---|
| 1 | 2.94 | 0.00 | 1.27 | 0.00 | 2.94 | 4.85 |
| 2 | 0.00 | 0.05 | 0.00 | 0.00 | 1.08 | 7.40 |
| 3 | 9.57 | 12.35 | 9.35 | 4.19 | 1.41 | 0.00 |
| 4 | 0.00 | 0.00 | 29.23 | 0.00 | 0.00 | 0.84 |
| 5 | 0.00 | 13.40 | 0.00 | 24.75 | 0.00 | 0.00 |
| 6 | 0.00 | 0.00 | 0.00 | 0.00 | 0.38 | 0.00 |
| 7 | 0.00 | 6.19 | 0.00 | 0.00 | 32.26 | 1.36 |
| 8 | 0.82 | 0.00 | 0.94 | 1.30 | 0.00 | 0.00 |
| 9 | 0.00 | 0.00 | 0.00 | 0.00 | 0.00 | 0.00 |
| 10 | 0.00 | 0.00 | 0.00 | 0.00 | 0.00 | 0.00 |

The total cost of provision is the sum of all elements in this table, except those highlighted. In this case the cost of provision is $64.63, considerably less than $145.7.6 outlined in Scenario 1.

Scenario 5

The result in Scenario 4 will always favor songs on the consumers' playlist because they are free to provide and thus do not incur any monetary penalty to use. This may be appropriate for some consumers, who like to hear their favourite songs often.

If the consumer does not like this, the system may allow them to alter the parameters guiding the rating matrix by adding an extra parameter to their search result (find me songs that sound like X, but are new and not in my playlist).

An alternative method is to spend the maximum amount of money available. Given that consumers may already be paying a set subscription fee in order to use the service, they may prefer this result. Producers would also prefer this result as it ensures a more predictable income stream.

This can be achieved by placing an inferred price on the consumer's own library. In Scenario 4, songs owned by the consumer are a source of large amount of consumer surplus, as they are provided for free. In Scenario 4, songs that provide a better fit to the ratings matrix are substituted for other songs that fit less well but are provided at a cheaper price (free). By placing an inferred price on these songs, this substitution effect is reduced, and these songs are replaced by songs that better fit the recommendation result but are more expensive. In effect, placing this inferred price allows consumers to increase the quality of the recommendation result at the expense of additional expenditure. Consider the consumer surplus table from Scenario 4.

TABLE 26

Scenario 5 Original Consumer Surplus Table-$S^1$

| Song | Consumer 1 | 2 | 3 | 4 | 5 | 6 |
|---|---|---|---|---|---|---|
| 1 | 0.43 | -0.96 | 0.13 | -0.72 | 0.24 | 1.16 |
| 2 | -1.09 | 0.00 | -1.15 | -0.42 | 0.12 | 2.50 |
| 3 | 1.93 | 0.78 | 1.34 | 0.45 | 0.16 | -0.65 |
| 4 | -2.07 | -2.55 | 1.79 | -2.58 | -0.84 | 0.12 |
| 5 | -0.97 | 0.54 | -1.75 | 1.71 | -0.25 | -1.38 |
| 6 | -0.91 | -0.91 | -1.12 | -0.55 | 0.03 | -0.41 |
| 7 | -1.73 | 0.24 | -1.85 | -1.21 | 2.19 | 0.27 |
| 8 | 0.13 | -0.35 | 0.11 | 0.11 | -1.43 | -0.80 |
| 9 | -0.32 | -0.92 | -1.24 | -1.60 | -2.17 | -2.60 |
| 10 | -998.80 | -998.48 | -998.00 | -997.87 | -999.41 | -999.93 |

Instead of subtracting zero from highlighted elements, the system now subtracts a non zero price calculated using a solver so that the total cost of provision equals 120. In this case an inferred price of 1.8 on songs in the consumers' own library will achieve this result. See tables 29 to 32 below.

TABLE 27

Scenario 5, Adjusted Consumer Surplus Table-$S^1$

| Song | Consumer 1 | 2 | 3 | 4 | 5 | 6 |
|---|---|---|---|---|---|---|
| 1 | 0.43 | -0.96 | 0.13 | -0.72 | 0.24 | 1.16 |
| 2 | -1.09 | 0.00 | -1.15 | -0.42 | 0.12 | 2.50 |
| 3 | 0.13 | 0.78 | 1.34 | 0.45 | -1.64 | -0.65 |
| 4 | -2.07 | -2.55 | -0.01 | -2.58 | -0.84 | -1.68 |
| 5 | -0.97 | 0.54 | -1.75 | -0.09 | -0.25 | -1.38 |
| 6 | -0.91 | -0.91 | -1.12 | -0.55 | 0.03 | -0.41 |
| 7 | -1.73 | -1.56 | -1.85 | -1.21 | 0.39 | 0.27 |
| 8 | 0.13 | -0.35 | 0.11 | 0.11 | -1.43 | -0.80 |
| 9 | -0.32 | -0.92 | -1.24 | -1.60 | -2.17 | -2.60 |
| 10 | -998.80 | -998.48 | -998.00 | -997.87 | -999.41 | -999.93 |

TABLE 28

Scenario 5 Non Negative Consumer Surplus Table-$S^2$

| Song | Consumer 1 | 2 | 3 | 4 | 5 | 6 |
|---|---|---|---|---|---|---|
| 1 | 0.43 | 0.00 | 0.13 | 0.00 | 0.24 | 1.16 |
| 2 | 0.00 | 0.00 | 0.00 | 0.00 | 0.12 | 2.50 |
| 3 | 0.13 | 0.78 | 1.34 | 0.45 | 0.00 | 0.00 |
| 4 | 0.00 | 0.00 | 0.00 | 0.00 | 0.00 | 0.00 |
| 5 | 0.00 | 0.54 | 0.00 | 0.00 | 0.00 | 0.00 |
| 6 | 0.00 | 0.00 | 0.00 | 0.00 | 0.03 | 0.00 |
| 7 | 0.00 | 0.00 | 0.00 | 0.00 | 0.39 | 0.27 |
| 8 | 0.13 | 0.00 | 0.11 | 0.11 | 0.00 | 0.00 |
| 9 | 0.00 | 0.00 | 0.00 | 0.00 | 0.00 | 0.00 |
| 10 | 0.00 | 0.00 | 0.00 | 0.00 | 0.00 | 0.00 |
| Total | 0.69 | 1.32 | 1.59 | 0.57 | 0.79 | 3.93 |

TABLE 29

Scenario 5 Optimized (Value for Money) Quantity Provision-$Q^2$

| Song | Consumer 1 | 2 | 3 | 4 | 5 | 6 | Total |
|---|---|---|---|---|---|---|---|
| 1 | 6.24 | 0.00 | 1.59 | 0.00 | 6.02 | 2.94 | 16.79 |
| 2 | 0.00 | 0.05 | 0.00 | 0.00 | 3.14 | 6.37 | 9.55 |
| 3 | 1.81 | 11.79 | 16.09 | 13.57 | 0.00 | 0.00 | 43.26 |
| 4 | 0.00 | 0.00 | 0.00 | 0.00 | 0.00 | 0.00 | 0.00 |
| 5 | 0.00 | 8.16 | 0.00 | 0.00 | 0.00 | 0.00 | 8.16 |
| 6 | 0.00 | 0.00 | 0.00 | 0.00 | 0.83 | 0.00 | 0.83 |
| 7 | 0.00 | 0.00 | 0.00 | 0.00 | 10.01 | 0.69 | 10.71 |
| 8 | 1.95 | 0.00 | 1.32 | 3.43 | 0.00 | 0.00 | 6.70 |
| 9 | 0.00 | 0.00 | 0.00 | 0.00 | 0.00 | 0.00 | 0.00 |
| 10 | 0.00 | 0.00 | 0.00 | 0.00 | 0.00 | 0.00 | 0.00 |
| Total | 10.00 | 20.00 | 19.00 | 17.00 | 20.00 | 10.00 | 96.00 |

TABLE 30

Scenario 5 Optimized Cost of Provision-C

| Song | Consumer 1 | 2 | 3 | 4 | 5 | 6 |
|---|---|---|---|---|---|---|
| 1 | 10.60 | 0.00 | 2.70 | 0.00 | 10.24 | 5.00 |
| 2 | 0.00 | 0.06 | 0.00 | 0.00 | 3.76 | 7.62 |
| 3 | 2.25 | 14.59 | 19.91 | 16.80 | 0.00 | 0.00 |
| 4 | 0.00 | 0.00 | 0.00 | 0.00 | 0.00 | 0.00 |
| 5 | 0.00 | 15.84 | 0.00 | 0.00 | 0.00 | 0.00 |
| 6 | 0.00 | 0.00 | 0.00 | 0.00 | 1.34 | 0.00 |
| 7 | 0.00 | 0.00 | 0.00 | 0.00 | 20.20 | 1.40 |
| 8 | 2.95 | 0.00 | 2.01 | 5.19 | 0.00 | 0.00 |
| 9 | 0.00 | 0.00 | 0.00 | 0.00 | 0.00 | 0.00 |
| 10 | 0.00 | 0.00 | 0.00 | 0.00 | 0.00 | 0.00 |

Total cost of provision in this table (the sum of all non-highlighted elements) is 120.

Scenario 6—Automatic Pricing

Given that the system'can accurately predict consumer consumption based on past data, it can also provide a service to producers in regards to helping them set a best possible price point in order to maximize their profits.

The simplest predictive method for pricing would be to simply assume that all other competitors have fixed prices and set a price which maximizes revenue (price times quantity).

In this example we return to the original model.

TABLE 31

Scenario 6 Ratings Matrix - R

| Song | Consumer 1 | 2 | 3 | 4 | 5 | 6 |
|---|---|---|---|---|---|---|
| 1 | 3.69 | 1.45 | 3.40 | 2.26 | 3.36 | 3.80 |
| 2 | 0.19 | 2.35 | 0.09 | 1.79 | 2.29 | 4.92 |
| 3 | 3.34 | 3.95 | 4.79 | 3.90 | 0.27 | 0.78 |
| 4 | 1.45 | 0.69 | 3.33 | 0.73 | 3.56 | 0.16 |
| 5 | 1.68 | 4.85 | 0.35 | 3.94 | 2.92 | 0.75 |
| 6 | 1.22 | 1.37 | 0.92 | 2.44 | 2.85 | 1.59 |
| 7 | 0.49 | 0.47 | 0.31 | 1.86 | 3.80 | 3.05 |
| 8 | 2.86 | 2.28 | 3.01 | 3.76 | 0.15 | 0.95 |
| 9 | 4.65 | 4.08 | 3.26 | 3.22 | 1.44 | 0.54 |
| 10 | 2.09 | 2.97 | 3.71 | 4.92 | 1.02 | 0.09 |
| Total | 21.65 | 24.46 | 23.16 | 28.83 | 21.67 | 16.62 |

We have a maximum amount of money that we can spend on the provision of radios stations—X is $150 and Q is as before.

Again each producer is allowed to set prices for their songs, except in this case the producer of song 1 is attempting to maximize profits by using the revenue optimizer.

TABLE 32

Scenario 6 Initial Price Vector - P

| Song | Price per Play |
|---|---|
| 1 | 1.70 |
| 2 | 1.20 |
| 3 | 1.24 |
| 4 | 2.90 |
| 5 | 1.94 |

TABLE 32-continued

Scenario 6 Initial Price Vector - P

| Song | Price per Play |
|---|---|
| 6 | 1.61 |
| 7 | 2.02 |
| 8 | 1.51 |
| 9 | 3.00 |
| 10 | 1000.00 |

As before in Scenario 1, we end up at the following Cost of Provision Table.

TABLE 33

Scenario 6 Initial Cost of Provision Table - C

| Song | Consumer | | | | | |
|---|---|---|---|---|---|---|
| | 1 | 2 | 3 | 4 | 5 | 6 |
| 1 | 5.40 | 0.00 | 6.17 | 0.00 | 9.77 | 5.17 | 26.51
| 2 | 0.00 | 2.64 | 0.00 | 0.00 | 4.32 | 6.68 | 13.64
| 3 | 4.76 | 11.57 | 15.10 | 11.57 | 0.00 | 0.00 | 43.00
| 4 | 0.00 | 0.00 | 0.00 | 0.00 | 0.00 | 0.00 | 0.00
| 5 | 0.00 | 16.38 | 0.00 | 4.05 | 2.59 | 0.00 | 23.02
| 6 | 0.00 | 0.00 | 0.00 | 0.00 | 5.70 | 0.00 | 5.70
| 7 | 0.00 | 0.00 | 0.00 | 0.00 | 11.64 | 2.78 | 14.42
| 8 | 2.73 | 0.00 | 4.80 | 8.43 | 0.00 | 0.00 | 15.96
| 9 | 3.51 | 0.00 | 0.00 | 0.00 | 0.00 | 0.00 | 3.51
| 10 | 0.00 | 0.00 | 0.00 | 0.00 | 0.00 | 0.00 | 0.00
| | | | | | | Total | 145.76 |

From here we can see that total revenue for Song 1 is 26.51. The system can now set the price for Song 1 so that this revenue is maximized using an automated solver (in this case the same algorithm as provided in Excel™ Solver).

TABLE 34

Scenario 6 Optimized Price Vector - P*

| Song | Price per Play |
|---|---|
| 1 | 1.49 |
| 2 | 1.20 |
| 3 | 1.24 |
| 4 | 2.90 |
| 5 | 1.94 |
| 6 | 1.61 |
| 7 | 2.02 |
| 8 | 1.51 |
| 9 | 3.00 |
| 10 | 1000.00 |

TABLE 35

Scenario 6 Optimized Cost of Provision Table - C

| Song | Consumer | | | | | |
|---|---|---|---|---|---|---|
| | 1 | 2 | 3 | 4 | 5 | 6 |
| 1 | 5.39 | 0.00 | 6.85 | 0.00 | 10.19 | 4.88 | 27.31
| 2 | 0.00 | 2.64 | 0.00 | 0.00 | 4.00 | 6.46 | 13.10
| 3 | 4.46 | 11.57 | 14.16 | 11.57 | 0.00 | 0.00 | 41.77
| 4 | 0.00 | 0.00 | 0.00 | 0.00 | 0.00 | 0.00 | 0.00
| 5 | 0.00 | 16.38 | 0.00 | 4.05 | 2.40 | 0.00 | 22.82
| 6 | 0.00 | 0.00 | 0.00 | 0.00 | 5.27 | 0.00 | 5.27
| 7 | 0.00 | 0.00 | 0.00 | 0.00 | 10.77 | 2.69 | 13.45
| 8 | 2.56 | 0.00 | 4.50 | 8.43 | 0.00 | 0.00 | 15.49
| 9 | 3.29 | 0.00 | 0.00 | 0.00 | 0.00 | 0.00 | 3.29
| 10 | 0.00 | 0.00 | 0.00 | 0.00 | 0.00 | 0.00 | 0.00
| | | | | | | Total | 142.52 |

From this table we can see that the producer of Song 1 has the opportunity to raise revenues from 26.51 to 27.31 by reduce the price of their music to 1.49 from 1.70.

Persons skilled in the art will also appreciate that many variations may be made to the invention without departing from the scope of the invention. In particular, although exemplified by provision of playlists of songs over the internet, the invention extends in its broadest form to the provision of any goods or services by any route.

In the claims which follow and in the preceding description of the invention, except where the context requires otherwise due to express language or necessary, implication, the word "comprise" or variations such as "comprises" or "comprising" is used in an inclusive sense, i.e. to specify the presence of the stated features but not to preclude the presence or addition of further features in various embodiments of the invention.

Further, recitation of the method steps in a particular order does not imply serial performance unless the context requires.

It is to be understood that, if any prior art publication is referred to herein, such reference does not constitute an admission that the publication forms a part of the common general knowledge in the art, in Australia or any other country.

REFERENCES

1. S. A. Chatzichristofis and Y. S. Boutalis, "CEDD: COLOR AND EDGE DIRECTIVITY DESCRIPTOR—A COMPACT DESCRIPTOR FOR IMAGE INDEXING AND RETRIEVAL.", « 6th International Conference in advanced research on Computer Vision Systems ICVS 2008» Proceedings: Lecture Notes in Computer Science (LNCS) pp. 312-322, May 12 to May 15, 2008, Santorini, Greece
2. S. A. Chatzichristofis and Y. S. Boutalis, "FCTH: FUZZY COLOR AND TEXTURE HISTOGRAM—A LOW LEVEL FEATURE FOR ACCURATE IMAGE RETRIEVAL", « 9th International Workshop on. Image Analysis for Multimedia Interactive Services", Proceedings: IEEE Computer Society pp. 191-196, May 7 to May 9, 2008, Klagenfurt, Austria
3. McEnnis, D., C. McKay, I. Fujinaga, and P. Depalle. 2005. jAudio: A feature extraction library *Proceedings of the International Conference on Music Information Retrieval*. 600-3.

The invention claimed is:

1. A method of a selection service recommending or providing access to goods or service items to one or more consumers via a controller, wherein the controller comprising a processor and a memory storing code which when executed by the processor causes implementation of the steps of:
   identifying available items comprising goods or services at least some of which require payment to item providers for access;

predicting a rating of likely enjoyment of each of the available items by each consumer;

normalizing the ratings with respect to the number of available items;

determining an inferred value of each available item by adjusting each rating with respect to an amount of money available to spend;

deducting a production price from each inferred value so as to derive an optimized measure of value for money of each of the available items for the consumers; and recommending or providing access to each of the available items to consumers that according to the optimized measures will represent good value for money.

2. The method as claimed in claim 1, wherein the available items comprise digital media items to be accessed over a network.

3. The method as claimed in claim 2, wherein the item providers comprise authors, creators or producers of the digital media items.

4. The method as claimed in claim 2, wherein there are a plurality of consumers, each of which pays the selection service to receive access to the digital media items.

5. The method as claimed in claim 4, wherein the consumers pay a periodical fee to receive the access to the digital media items.

6. The method as claimed in claim 4, wherein the item providers are paid by the selection service.

7. The method as claimed in claim 6, wherein the item providers are paid on based on of each consumer use of the digital media item.

8. The method as claimed in claim 1, wherein the step of predicting a measure of likely enjoyment of each available item by the consumer comprises calculating a closeness of fit of each available item with example items or categories enjoyed by the consumer.

9. The method as claimed in claim 8, wherein the example items or categories are specified by the consumer.

10. The method as claimed in claim 8, wherein the example items or categories are deduced by past consumer behavior.

11. The method as claimed in claim 1, wherein the step of calculating a measure of value for money of each available item for the consumer comprises:

calculating a value of each available item for the consumer based on at least the measure of likely enjoyment; and comparing the value with any said payment required for access.

12. The method as claimed in claim 1, wherein the step of recommending or providing access to items to the consumer that will represent good value for money comprises:

selecting items whose value exceeds any said payment required for access;

recommending or providing access to the selected items on a per use frequency basis that depends on the excess value.

13. The method as claimed in claim 1, wherein the available items are songs that access to which is provided by the selection service in a playlist.

14. A system for enabling a selection service to recommend or provide access to items to one or more consumers, comprising:

an interface for the consumer to access the items; and a controller for enabling a selection service to recommend or provide access to items to a consumer over an interface, the controller comprising a processor and a memory storing code which when executed by the processor causes implementation of:

an available item identifier for identifying a set of available items at least some of which require payment to item providers for access;

a likely enjoyment predictor for predicting a rating of likely enjoyment of each available item by each consumer;

a value for money calculator for normalizing the ratings with respect to the number of available items, determining an inferred value of each available item by adjusting each rating with respect to an amount of money available to spend, and deducting a production price from each inferred value so as to derive an optimized measure of value for money of each available item for the consumers; and an access decider for recommending or providing access to items to consumers that will represent good value for money.

15. A controller for enabling a selection service to recommend or provide access to items to one or more consumers over an interface, the controller comprising a processor and a memory storing code which when executed by the processor causes implementation of:

an available item identifier for identifying a set of available items at least some of which require payment to item providers for access;

a likely enjoyment predictor for predicting a rating of likely enjoyment of each available item by each consumer;

a value for money calculator for normalizing the ratings with respect to the total numbers of available items, determining an inferred value of each available item by adjusting each rating with respect to an amount of money available to spend, and deducting a production price from each inferred value so as to derive an optimized measure of value for money of each available item for the consumer; and an access decider for recommending or providing access to items to consumers that according to the optimized measures will represent good value for money of each available item for the consumer.

16. A non-transitory computer readable medium comprising the computer program code which when executed by a computer device causes the computing device to implement the method of claim 1.

* * * * *